United States Patent
Riley et al.

(10) Patent No.: US 6,633,788 B1
(45) Date of Patent: Oct. 14, 2003

(54) DATA PROCESSING METHOD AND SYSTEM

(75) Inventors: Paul H Riley, Derby (GB); Nicholas R Milton, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/392,305

(22) Filed: Sep. 8, 1999

(30) Foreign Application Priority Data

Sep. 12, 1998 (GB) .............................................. 9819851

(51) Int. Cl.$^7$ .............................................. G06F 19/00
(52) U.S. Cl. .................................... 700/97; 707/103 R
(58) Field of Search ........................... 700/97, 96, 103, 700/104, 105; 717/108, 125, 163, 165; 707/103, 506, 102

(56) References Cited

U.S. PATENT DOCUMENTS

| | | | | |
|---|---|---|---|---|
| 4,550,532 A | * | 11/1985 | Fletcher et al. ................. | 451/5 |
| 5,201,045 A | * | 4/1993 | Pflueger et al. ................. | 714/4 |
| 5,222,130 A | * | 6/1993 | Pflueger et al. ........ | 379/399.02 |
| 5,240,845 A | * | 8/1993 | Fujii et al. ................... | 435/216 |
| 5,274,807 A | * | 12/1993 | Hoshen et al. .............. | 707/205 |
| 5,500,802 A | | 3/1996 | Morris ........................ | 700/182 |
| 5,563,998 A | * | 10/1996 | Yaksich et al. ............. | 707/507 |
| 5,563,999 A | * | 10/1996 | Yaksich et al. ............. | 707/507 |
| 5,689,435 A | | 11/1997 | Umney .......................... | 703/1 |
| 5,758,333 A | * | 5/1998 | Bauer et al. .................... | 707/1 |
| 6,223,214 B1 | * | 4/2001 | Tufty et al. ................. | 709/217 |

FOREIGN PATENT DOCUMENTS

| | | |
|---|---|---|
| WO | WO 94/19742 A | 9/1994 |
| WO | WO 94/29804 A | 12/1994 |
| WO | WO 97/15886 A1 A | 5/1997 |

* cited by examiner

*Primary Examiner*—Leo Picard
*Assistant Examiner*—Chad Rapp
(74) *Attorney, Agent, or Firm*—W. Warren Taltavull; Manelli Denison & Selter PLLC

(57) ABSTRACT

A data processing method and a computer based data processing system for use in providing, or optimising, an industrial procedure for generating a product. The system comprising digital processing means, and digital storage means. The storage means having a database stored therein comprising (a) data defining generic product descriptions in terms of physical and/or functional elements and associated properties; b) data defined a plurality of generic process descriptions in terms of process activities, activity sequence, and associated process capabilities, at least one of said generic process descriptions including an iterative set of process activities, and; c) data defining rules relating to a) and b). The method comprising providing the system with specific product information for the product. This including information associating the product with one or more of the generic product descriptions and information defining constraints for the product in terms of said properties of the associated generic product descriptions. Then operating the digital processing means in accordance with the rules to derive for the specific product information, from the data of a) and b), a valid combination of the specific product information and a generic process description as the procedure for generating the product. The method and system being able to provide a detailed procedure description from which can be derived other results, for use with process visualisation tools and workflow planning tools for example.

14 Claims, 17 Drawing Sheets

Fig.9.

| Product Class | Type Automobile | Table PC3 Aero-Engine |
|---|---|---|
| Consumer Transport | ✓ | |
| Gas Turbine | | ✓ |

Fig.10.

Generic Class Table PC22

| Product | Type Mechanical | Rotating | Electronic |
|---|---|---|---|
| Automobile | ✓ | | ✓ |
| Aero Engine | ✓ | | ✓ |

Fig.11.

Generic Class Table PC22

| Product Class | Constraint Safety | Life | Cost | Weight | Style | Aerodynamic |
|---|---|---|---|---|---|---|
| Consumer Transport | ✓ | ✓ | ✓ | | ✓ | ✓ |
| Gas Turbine | ✓ | ✓ | ✓ | ✓ | | ✓ |

Fig. 12.

TABLE C1

Product Type Mechanical Rotating

Constraint
Safety
Life

Analyse
FMEA
Vibration Analysis   Steady State Stress   Bearing Loads

TABLE C2

Product Type Electronic

Constraint
Safety
Life

Analyse
EMC Compliance   Insulation
DO178 Predictions

Fig. 13.

Word Classes

Table W1

Nouns for Company A

| | Activity Class | | | |
|---|---|---|---|---|
| | Breakdown Requirements | Define | Analyse | Approve |
| Mechanical Design | Create Functional Specification | Generate CAD Model | Analyse<Object>for Vibration | Sign Scheme |
| Mechanical Manufacturing | Interpret and Comply | Turn, Mill, Grind | Test | QA Stamp |
| Electronic | Design System | Create Circuit Diagram | Analyse | Sign Circuit Diagram |
| Software | Generate Requirements Spec | Write Code | Verify Module | Sign Verification Report |

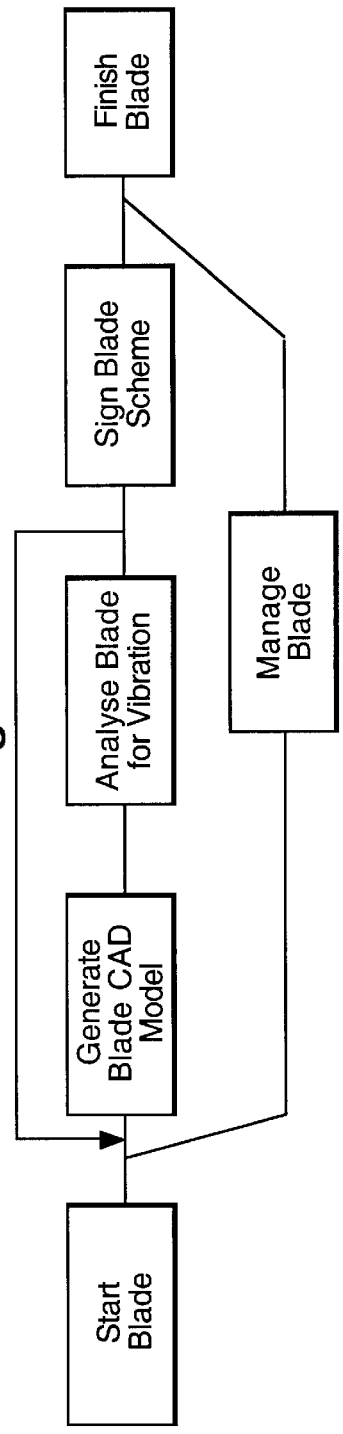

Process Capability 1  Table P4

| For Company A | Easy | Med | Hard |
|---|---|---|---|
| Turbine TGT= | <1700 | 1700-1750 | >1750 |
| HPC Efficiency | <82% | 82-87% | >87% |

Table P5

| For Company B | Easy | Med | Hard |
|---|---|---|---|
| Turbine TGT= | <1750 | 1750-1800 | >1800 |
| HPC Efficiency | <86% | 86-90% | >90% |

Fig.16.

Table P2

Number of Iterations to Meet Spec

| Constraint / Process Capability | Easy | Med | Hard |
|---|---|---|---|
| Mean | 1 | 2 | 5 |
| Standard Deviation | 0.2 | 1 | 2 |

Instance  Table P3

Product Complexity

| For Company A | Easy | Med | Hard |
|---|---|---|---|
| Casing Number Features | <10 | 10-100 | >100 |
| Compressor Blade | Aerofoil Points no Fillets | Nurbs, no Fillets | Nurbs With Fillets |

Fig.17.

Generic  Table P1

Work Hours for Finite Element Analysis

| Product Complexity | FE Process Capability | | |
|---|---|---|---|
| | Low | Med | High |
| Low | 6 Weeks | 2 Weeks | 1 Day |
| Med | Infinite | 5 Weeks | 1 Day |
| High | Infinite | Infinite | 2 Weeks |

Fig.22.

| Objects | | | Processes | | | | | | | | | | | | | | |
|---|---|---|---|---|---|---|---|---|---|---|---|---|---|---|---|---|---|
| | | | | | | | | Process | | | | | | | | | |
| | | | | | Approve | | | | | * | Analyse | | | | Define | | |
| | | | | | | Inspections | | | * | | | | | * | | * | * |
| | | | | Process | Approve | Inspection | Process_Characterisation * | Process_Control | Parameter_Verification | Seal_Process_Version | Breakdown_Requirements | Analyse | SPC | Multi-Variable_Linear_Regression | Kalman_Filter | Refine_Parameters | Define | Manufacture_Part | Define_Inspection |
| | | Aero Engine | ▫ | ▫ | ▫ | ▫ | ▫ | ▫ | ▫ | ▫ | ▫ | ▫ | ▫ | ▫ | ▫ | ▫ | ▫ | ▫ |
| | Aero Engine | Turbine Blade | ▫ | ▫ | ▫ | ▫ | ▫ | | ▫ | ▫ | ▫ | ▫ | ▫ | ▫ | ▫ | ▫ | ▫ |
| | | Shroud | ▫ | ▫ | ▫ | | ▫ | | | ▫ | ▫ | ▫ | ▫ | ▫ | ▫ | ▫ | ▫ |
| | Turbine Blade | Aerofoil | ▫ | ▫ | ▫ | ▫ | ▫ | | ▫ | ▫ | ▫ | ▫ | ▫ | ▫ | ▫ | ▫ | ▫ |
| | | Fir Tree Root | ▫ | ▫ | ▫ | ▫ | ▫ | | ▫ | ▫ | ▫ | ▫ | ▫ | ▫ | ▫ | ▫ | ▫ |
| | | Cooling Passages | ▫ | ▫ | ▫ | ▫ | ▫ | | ▫ | ▫ | ▫ | ▫ | ▫ | ▫ | ▫ | ▫ | ▫ |
| | | Cooling Holes | ▫ | ▫ | ▫ | ▫ | ▫ | | ▫ | ▫ | ▫ | ▫ | ▫ | ▫ | ▫ | ▫ | ▫ |
| | | Platform | ▫ | ▫ | ▫ | ▫ | ▫ | | ▫ | ▫ | ▫ | ▫ | ▫ | ▫ | ▫ | ▫ | ▫ |

| 7 | | ▶ |
|---|---|---|
| Process Define and Verify | | Focus Turbine Blade |

Fig.26.

Process Capability 2  Table P6

Stages of HPC 1980
| | | | | |
|---|---|---|---|---|
| Compressor Ratio | 6 | 7 | 8 | 9 |
| Mean | 6 | 7 | 8 | 9 |
| Standard Deviation | 0.6 | 0.6 | 0.8 | 0.9 |

Stages of HPC 1990
| | | | | |
|---|---|---|---|---|
| Compressor Ratio | 6 | 7 | 8 | 9 |
| Mean | 5 | 6 | 7 | 8 |
| Standard Deviation | 0.5 | 0.5 | 0.7 | 0.85 |

Stages of HPC 2005
| | | | | |
|---|---|---|---|---|
| Compressor Ratio | 6 | 7 | 8 | 9 |
| Mean | 4 | 5 | 6 | 7 |
| Standard Deviation | 0.5 | 0.5 | 0.7 | 0.85 |

DATA PROCESSING METHOD AND SYSTEM

FIELD OF THE INVENTION

The present invention relates to a data processing method and a computer based data processing system for use in providing a procedure for generating a product. The method and system are useful tools in the development and/or optimisation of procedures in particular, although not necessarily exclusively, design, development and manufacturing procedures for bringing a product to a market.

BACKGROUND OF THE INVENTION

For a business enterprise to compete successfully it needs not only to provide the product the marketplace demands, but also to optimise the procedures by which that product is brought to the market. These procedures, for example design, development and manufacturing procedures, can be represented as a series of activities carried out on or in relation to the product and/or its constituent components and the sequence in which those activities are arranged, where the output from one activity provides an input to one or more subsequent activities.

The process of optimising these procedures generally involves improving the sequence of the activities making up the procedure and/or modifying, replacing, adding or deleting activities of the procedure. Typically, the possible alterations to a procedure are numerous. Some alterations will improve the procedure while others will be detrimental to the procedure. There may also be conflicting requirements placed on the procedure, for example, one requirement may be minimising costs, while another may be improving quality, in which case alternatives to the existing procedure may be advantageous in relation to one requirement whilst being detrimental in relation to another requirement.

A number of different types of tool are known for use in the development or re-engineering of procedures. There are tools that provide a uniform way of mapping the activities making up the procedure and their sequence. Others provide a methodological framework to direct the thinking of the user. It is also known to provide a computer based handbook as is described in WO94/19742, where the handbook contains a library of procedures which can be used to present the user with a possible operating sequence, or more usually a series of alternative operating sequences from which one can be chosen and modified if desired.

The known mapping tools enable a structured description of procedures and are useful for capturing information about existing procedures and for describing new or re-engineered procedures once they have been developed, but they provide no assistance in the development process itself. They also tend to encourage the user to take an existing description of the current procedure as the starting point for the development work, and so mitigate against any consideration of radical changes. The methodological tools that aim to stimulate the user to consider alternative approaches on the other hand have the weakness that they do not provide detailed information of the procedures available in any easily retrievable way and so tend to be relatively inefficient and costly in terms of time. The computer-based handbooks referred to are able to capture, and classify in a easily accessible manner, detailed descriptions of existing procedures, but they offer little assistance in envisaging radically different procedures.

SUMMARY OF THE INVENTION

The present invention is aimed at addressing some of the shortcomings of the known tools referred to above in providing a data processing method and a computer based data processing system for use in providing a procedure for generating a product.

In one aspect, the present invention provides a method of optimising an industrial procedure for a product, using a database comprising:

(a) generic product descriptions of product physical and/or functional elements and associated properties, (b) generic descriptions of processing elements and capabilities in relation to the procedure, and a series of rules relating to (a) and (b); specific product information being provided in terms of said generic product descriptions, including product constraints in terms of said associated properties, and the rules being operated to derive for the specific product information, from the data of (a) and (b)

(i) a selection of valid combinations of (a) and (b) as industrial activities, and (ii) an arrangement of the activities of (i) in order.

It is also possible to employ the series of rules so as to obtain additionally:

(iii) a derivation from (a) and (b) of a measure of effort to perform each activity, and (iv) integration of the results of (iii) for individual activities to derive a measure of the total effort required.

The constraints included in the specific product information can typically include requirements such as desired levels of efficiency of performance, specific dimensional tolerances of a physical product, acceptable levels of risk and/or a maximum duration for the procedure to be carried out for the product. These can be expected to affect the choice of procedure and its manner of performance in many instances. The operation of the rules therefore preferably also derives a prediction of the ability of the procedure to meet the constraints set.

Using generic product and process descriptions as a basis for developing procedures for a specific product helps avoid the inherent constraints of the known mapping tools and computer handbooks, which necessarily take specific product and procedure descriptions as their starting points. It thus facilitates radical departures from existing specific procedures for a specific product. For example, it might be that the specific procedures from which the generic descriptions of processing elements have been derived relate to products quite different in many respects from the specific product for which the new procedure is being developed, although prejudices in the art would inhibit any linking of those specific procedures with that product.

Advantageously the method of the invention is able to provide a detailed procedure description from which can be derived other results, for use with process visualisation tools and workflow planning tools for example.

The generic descriptions of processing elements may be derived from existing procedures for specific products. For example, specific activities of the same general class (e.g. analysis activities, definition activities etc.) can be analysed for a number of different procedures applied to a number of different products to extract from them a generic description of that class of activity as a processing element.

The database will typically include generic descriptions of processing elements for a plurality of different classes of activity (analysis, definition etc). For the or each class, there may be a number of different processing elements described at differing levels of abstraction. That is, some elements may be generally applicable to many different classes of procedure (design, manufacture, etc) and/or classes of product (mechanical, electronic, etc), while others may be of more limited application.

The rules used to derive the arrangement of the industrial activities, that is the valid combinations of generic product and processing element descriptions, may also be derived from existing, preferably best practice, procedures for specific products. In one form, these rules can be expressed as one or more process equations, the or each equation defining a sequence of generic processing elements as a generic process.

In another instance, in particular design and development procedures, but also some manufacturing procedures, the sequence of activities making up the procedure will include iterative activities where iterations of an activity or group of activities may be necessary to arrive at a valid output. For example, in a design procedure one might define a component part of a product and analyse the performance of that component in relation to constraints (eg. life, weight, cost etc.) associated with the product, repeating these activities a number of times before a component design is arrived at which best fits all the constraints. Preferably, the operation of the rules is then able to give a statistical prediction of the iterative effort.

In another aspect the present invention provides a data processing method for obtaining a procedure for generating a IS product, the method using a computer based data processing system comprising:

digital processing means, and digital storage means, the digital storage means having a database stored therein comprising:
(a) data defining generic product descriptions in terms of physical and/or functional elements and associated properties,
(b) data defining a plurality of generic process descriptions in terms of process activities, activity sequence, and associated process capabilities, at least one of said generic process descriptions including an iterative set of process activities, and
(c) data defining rules relating to (a) and (b), the method comprising:
providing the system specific product information for the product, including information associating the product with one or more of the generic product descriptions and information defining constraints for the product in terms of said properties of the associated generic product descriptions,
operating the digital processing means in accordance with the rules to derive for the specific product information, from the data of (a) and (b), a valid combination of the specific product information and a generic process description as the procedure for generating the product.

In the case where the valid combination is based on a generic process description including a description of said at least one iterative set of activities, the operation of the digital processing means also derives, on the basis of the product constraints and the process capabilities for the activities of said iterative set, a prediction of the number of iterations required, or a prediction of the outcome for a given number of iterations.

The data defining the process capabilities can, for example, take the form of look-up tables and/or statistical functions, defining relationships between product properties and a predicted number of iterations. In a further aspect the present invention provides a data processing method for obtaining a procedure for generating a product, the method using a computer based data processing system comprising:

digital processing means, and digital storage means, the digital storage means having a database stored therein comprising:
(a) data defining generic product descriptions in terms of physical and/or functional elements and associated properties,
(b) data defining a plurality of generic process descriptions in terms of process activities, activity sequence, and associated process capabilities, and
(c) data defining rules relating to (a) and (b), the method comprising:
providing the system with specific product information for the product, including information associating the product with one or more of the generic product descriptions and information defining constraints for the product in terms of said generic product properties, the data to be processed further including information defining ranges of probability of one or more parameters of said product,
operating the digital processing means in accordance with the rules to select a specific value for the or each said defined product parameter range and to derive for the specific product information, on the basis of said selected parameter(s), from the data of (a) and (b), a valid combination of the specific product information and a generic process description as the procedure for generating the product.

With this method it is possible to develop a complete description of a procedure for the product even when there is initial uncertainty in the definition of the product, as may be the case with a design procedure for example.

Optionally, the processing means carries out the above operation a plurality of times, each time selecting a value of the or each said product parameter, to develop a plurality of alternative possible procedures. Advantageously, the rules may control the processing means to carry out these plurality of operations in the manner of a 'Monte Carlo' simulation, to derive the most likely best case and worst case procedures in relation to the product constraints.

The present invention also provides computer based data processing systems operable in accordance with one or more of the aspects defined above.

Thus in yet another aspect, the invention provides a computer based data processing system for use in providing a procedure for generating a product, the system comprising:
(1) a storage unit having stored therein data defining:
(a) one or more generic product descriptions of product physical and for functional elements and associated properties;
(b) generic descriptions of processing elements and capabilities in relation to the procedure; and
(c) a series of rules relating to (a) and (b)
(2) a digital processing unit comprising a first processing means for operating the stored rules to derive for specific product information given in terms of said generic product description, from the stored data:
(i) a selection of valid combinations of (a) and (b) as industrial activities, and
(ii) an arrangement of the activities of (i) in order; and
a second processing means to store said derived selection and arrangement in the storage unit as an output file.

BRIEF DESCRIPTION OF THE DRAWINGS

Preferred features and examples of data processing systems and their methods of operation, according to the present invention, are described below with reference to the accompanying drawings, in which:

FIGS. 9–13 and 15–17 illustrate look-up tables used in the generation of a specific procedure, FIG. 14 illustrate a first specific procedure derived from the first generic process, FIG. 22 illustrates a matrix relating activities of the second generic process to components of a specific product.

FIG. 26 illustrates a look-up table used in the generation of a procedure for a product where there is uncertainty in a product parameter.

DETAILED DESCRIPTION OF THE INVENTION

Figure 1:
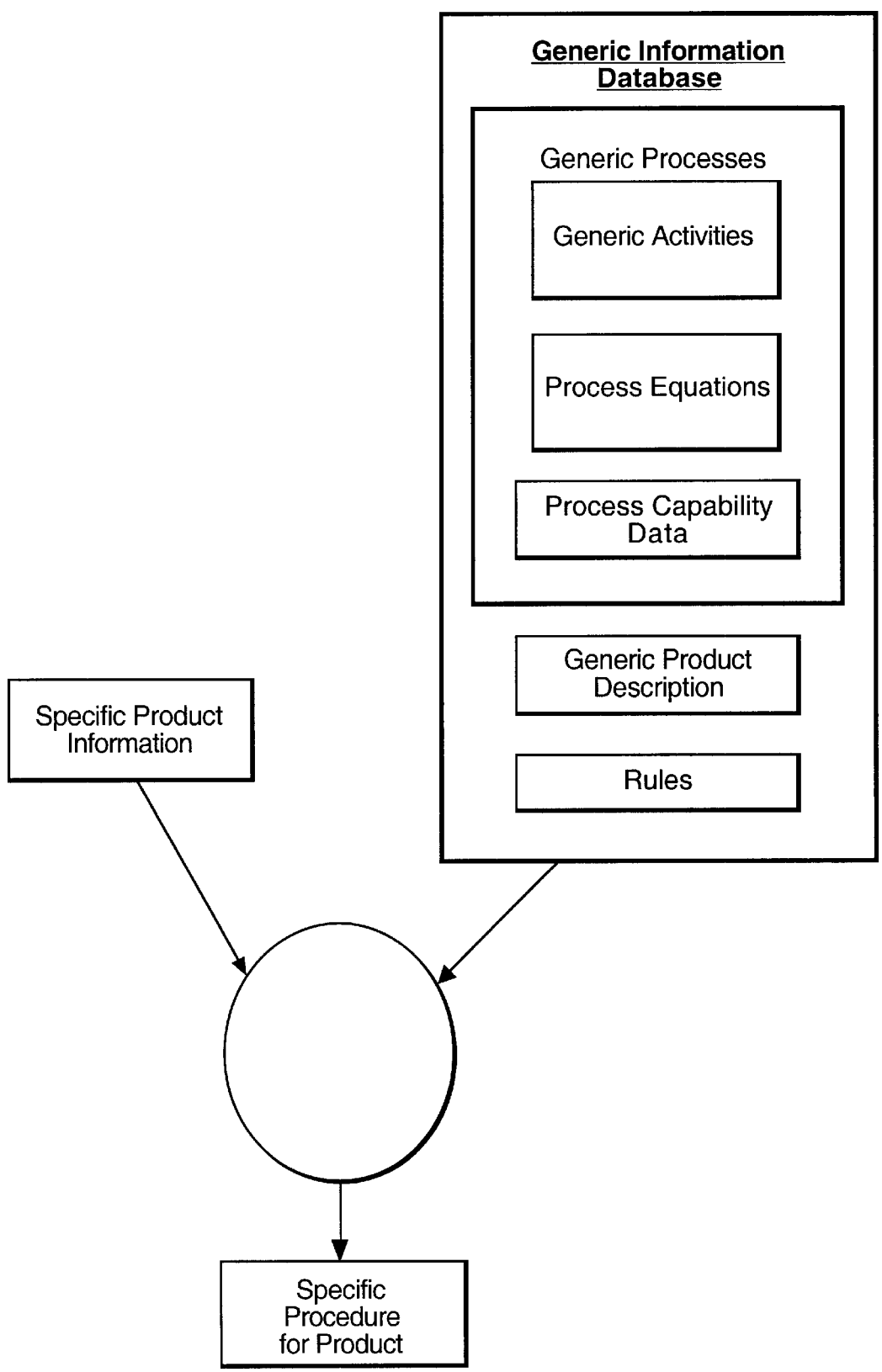
FIG. 1 is a schematic illustration of a data processing system according to an embodiment of the present invention.

FIG. 1 shows the principal components of a computer based data processing system, according to an embodiment of the present invention, which can be used to obtain industrial procedures for products. A procedure is generated by combining specific product information, which gives a description of the product for which the procedure is required, and associated constraints, with a description of a generic process selected from a generic information database. Each generic process is formed of a number of process activities having a defined sequence.

The generation or synthesis of the specific procedure is carried out in accordance with rules relating to the generic process and to a generic product description, or descriptions with which the specific product in question is associated. The rules and generic product descriptions form part of the generic information database, which provides a structured framework within which all of this information is stored as digital data.

Once generated, the procedure is stored in a format which can be used by other applications, for example Microsoft Project, to display the procedure to a user and/or to simulate and test the procedure.

The specific product information comprises a number of elements. There is data associating the specific product with one or more generic product descriptions. For example, if a blade for an axial compressor is the specific product, it may be described as a dynamic, specifically rotary, mechanical product. Also included in the specific product information is data defining one or more required standards or constraints for the product. These standards/constraints may be, for example, a maximum weight, a minimum life, a maximum cost, etc. Other product parameters, such as size etc may be included in the product information if relevant to the procedure being developed. Where a procedure is required for multiple components of a product, the information additionally includes data defining hierarchical breakdown of the product into the components, illustrated in FIG. 2 as a simplified example for an aero engine turbine blade.

Figure 3:
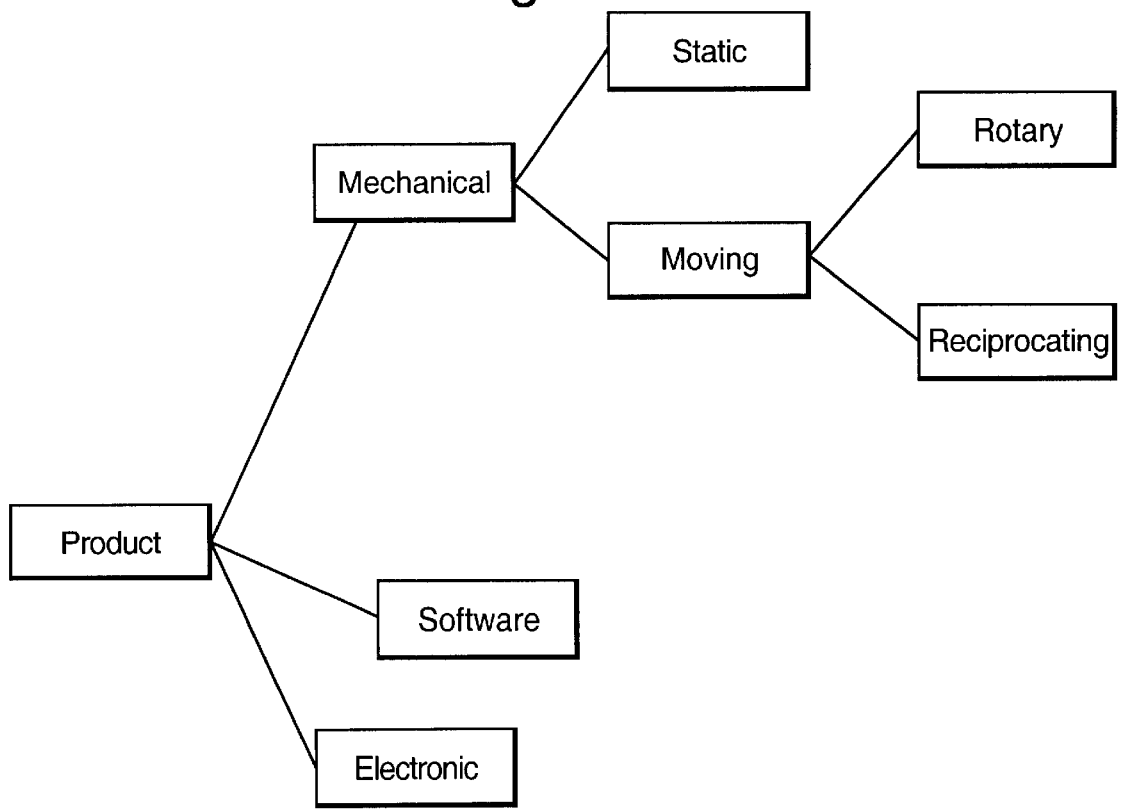
FIG. 3 is an extract from a generic product description tree, FIGS. 4a, 4b and 4c respectively show a generic "ANALYSIS" activity and two more specific instances thereof, FIGS. 5a, 5b and 5c respectively show a generic "DEFINE" activity and two more specific instances thereof.

The generic product descriptions are preferably stored in the database in the form of a hierarchical tree or taxonomy and are defined in terms of physical and/or functional elements. FIG. 3 shows an extract from such a tree. Each generic product description has associated with it one or more significant properties which are considered to be important and, in terms of which the specific product constraints can be expressed. Taking the example mentioned above, rotary mechanical products, the significant properties may include vibrating stresses, bursting stresses etc.

Considering the components of the generic processes in more detail, starting with the activities.

The activities may each be comprised in more than one of the generic processes and are themselves generic in nature. That is, they may be applicable to a plurality of different procedures, including for example different types of action (eg. manufacturing, design, marketing, etc) and/or procedures relating to different fields of technology (eg. electrical, mechanical, chemical etc). Each activity has a unique label by which it is identifiable and has associated with it a description of the activity, and optionally other data items such as descriptions of one or more inputs to/outputs from the activity, and/or product properties relevant to the activity. Where possible, these associated data items are preferably also in a generic form as illustrated in the following examples described with reference to FIGS. 4 and 5.

Figure 4A:
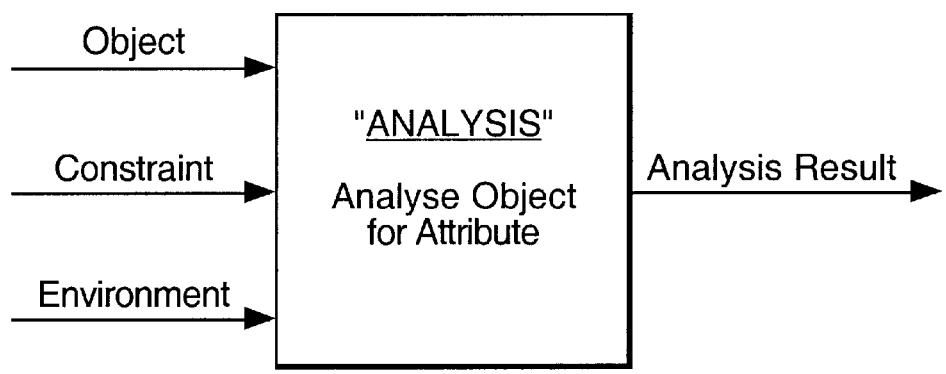
Figure 4B:
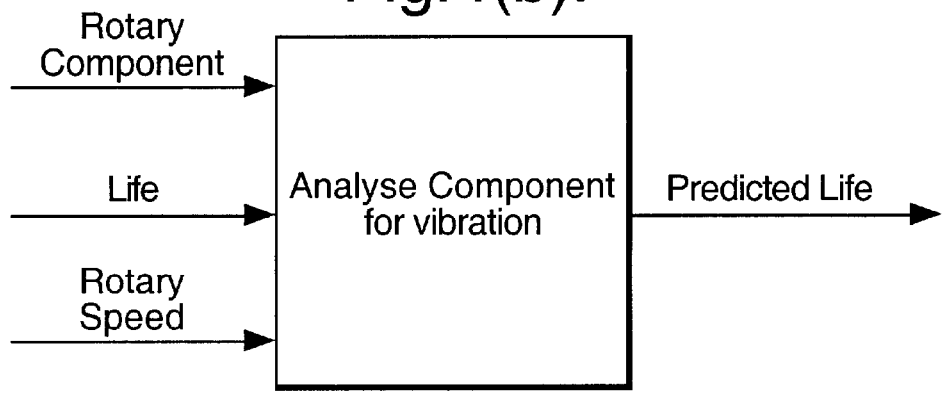
Figure 4C:
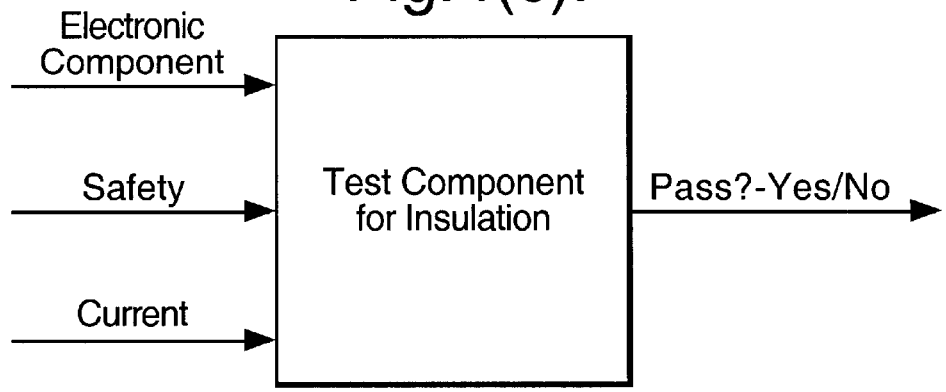

The generic activity illustrated in FIG. 4a is "ANALYSIS" and its associated description is "Analyse object for attribute". The inputs to the activity are described as "OBJECT", "CONSTRAINT" and "ENVIRONMENT", and the output as "ANALYSIS RESULT". FIGS. 4b and 4c show two more specific instances of this generic activity, relating to design of a rotary component and manufacture of an electronic component respectively. The "attribute" to be analysed is determined on the basis of the "CONSTRAINT" and the class of "OBJECT". In the second case the activity is described as "Test . . . ", a testing step being one example of analysis in the broader, generic sense.

Figure 5A:
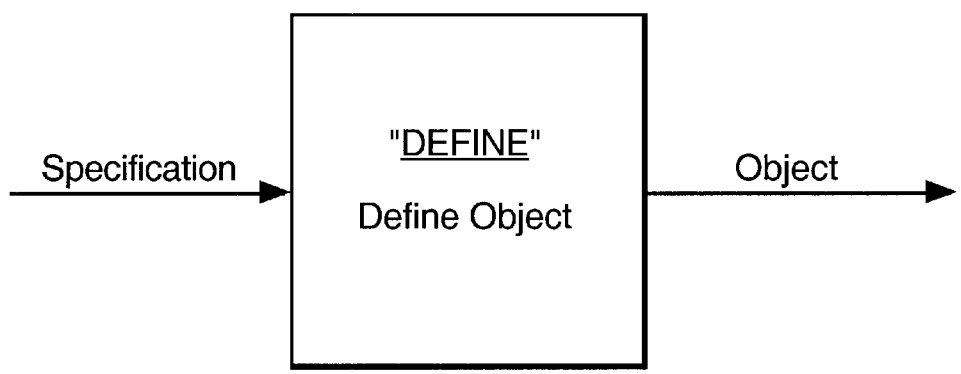
Figure 5B:
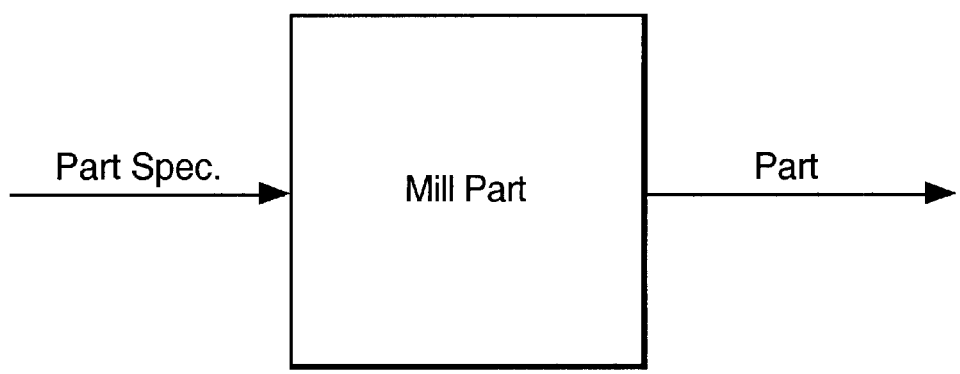
Figure 5C:
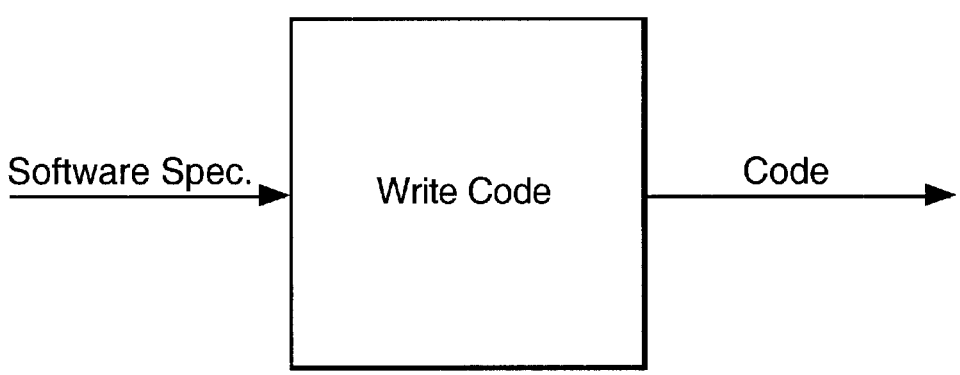

FIG. 5a shows another example of a generic activity. In this case the activity is "DEFINE". As with the analysis example, the two specific instances of the "DEFINE" activity, FIGS. 5b and 5c, illustrate the applicability of the generic activity to diverse specific cases, here mechanical manufacturing and software design.

Figure 6:
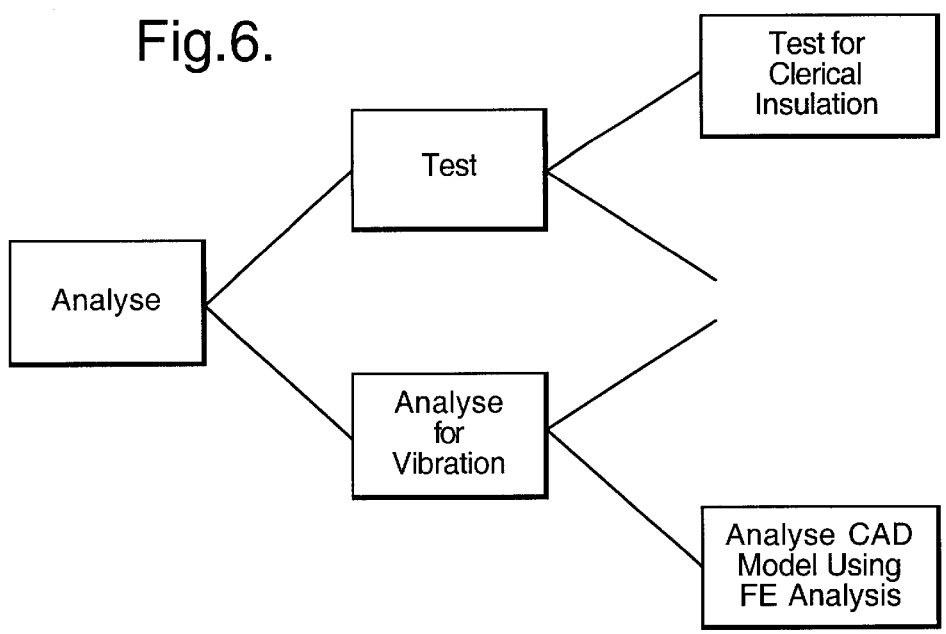
FIG. 6 is an extract from a first generic activity tree.

The generic information database contains a plurality of activities which are preferably classified in terms of the activities of widest applicability. For example, there may be an "ANALYSE" class of activities, including the activities illustrated in FIGS. 4a–4c. This can be represented as a hierarchical tree or taxonomy of activities, an example of which is seen in FIG. 6 for an extract from an "ANALYSE" class. The top level "ANALYSE" activity can be considered truly generic, in the sense that it describes all activities in the class. The activities further down the tree have varying levels of specificity to particular classes of product (mechanical, electrical etc) and/or classes of procedure (design, manufacture, etc) for example. The lower level activities inherit the data items (input/output descriptions, product properties, etc) associated with the activity from which they depend. If appropriate, these data items can then be made more specific in line with the specificity of the activity. This classification provides a structured way of storing additional activities and referencing the stored activities.

Each generic process may include within its scope activities from any number of levels within the activity classes. The higher the level of the activities making up the generic process the wider is the applicability of that process.

The other principle component of each generic process is the sequence of the activities. This can be expressed in terms of a process equation, which may for example simply be a list of the relevant activity labels in order. The equation may also be used to define more complicated sequences including parallel activities and/or iterations of an activity or a group of activities for example. These equations are preferably also stored in a structured way, such as a classified hierarchy or taxonomy.

Each activity or groups of activities may also have data associated with them defining the processing capability, that is to say the performance limit of the activity or group. This data is used to derive results such as the duration of the activity and/or the number of iterations of the activity necessary to meet defined standards for the object under consideration. Typically this capability data will be specific to particular activities at a fairly low level in the relevant activity class, because the same higher level description may include uncorrelated activities. Furthermore, capability may vary even within a specific activity. For example the finite element analysis capability of one organisation may be superior to that of another as a result for example of them possessing more advanced software or hardware. To account for this, for any particular activity, it is preferable to prescribe a series of capability data relating to different levels of capability in the activity.

The capability data itself may be expressed as specific values, eg. 2 weeks, 6 iterations etc, or alternatively may be expressed as statistical functions, for example in terms of a mean and a standard deviation. In the latter case, for any particular instance the data processing system can be set up to derive specific values for the duration and/or number of iterations in accordance with the statistical expression.

For many activities, the processing capability will also be dependent on particular characteristics of the product, typically including properties describing the complexity of the product as well as desired or required performance standards or constraints. Particularly when considering the duration of an activity, the complexity of a product can be an important characteristic; the same manufacturing or testing activity will typically take longer the more complex the product. On the other hand, the iterative effort is more likely to be dependent on how close one is working to the known performance limits (processing capability) of a particular activity in respect of particular product properties of the specific product under consideration, that is the product constraints and standards applicable in the specific case. For example, considering the design of a turbine blade, it may be relatively easy to produce a design able to withstand a turbine inlet temperature of less than 1700° C., but significantly harder if the desired inlet temperature is greater than 1800° C. In the latter case, it is likely that a greater iterative effort will be necessary.

Therefore, the processing capability data for each activity is preferably assigned on the basis of relevant properties of the product under consideration. It may be expressed in terms of duration and/or iteration data. Such data of product complexity and/or severity of standards and constraints can be classified in a normalised form, for example easy, medium or hard to achieve.

When deriving a specific instance of the activity the particular object under consideration can be assigned to a particular class of product complexity and/or severity, of constraints judged in relation to the relevant art. These classes are then used to identify the applicable capability data for the activity.

Taking the example of the compressor of a gas turbine, the complexity of the casing may be defined in terms of the number of features of the casing, the class of complexity being assigned on the basis of the number of features. For a turbine a standard/constraint relevant to the processing capability of an activity may be turbine entry temperature. For example, the class of severity being assigned on the basis of how close the desired value is to existing limits in the art for that standard/constraint.

The product property dependent processing capability of an activity, including the perceived complexity of a product may well be dependent on the state of technological advance or other such factors within a particular organisation; what is considered as a "hard" product by one firm may be of only "medium" complexity/severity for another. So, it is preferably possible to include product dependent capability/complexity data which is environment specific (eg. specific to a particular organisation or industry sector) as well as being specific to a product or class of complexity/severity.

Conveniently, the generic information database provides a structured environment in which all of this product specific capability data can be stored, for example as a number of data files representing look up tables or grids. Alternatively the user of the system can assign a particular normalised value to the specific object under consideration.

The rules used to control the generation of specific procedures, that is the combinations of selected generic processes with specific product information, may also form part of the generic information database. Similarly to the process capability data, these rules may comprise data files representing a series of look-up tables or grids which function to associate specific products with particular generic product descriptions and, on the basis of this, provide pointers to particular process capability data tables/grids for the activities of the selected generic process or processes. The rules also work to derive more particularised descriptions of the activities of the selected generic process. This may be achieved by using the associated generic product description, for example, as a pointer to lower level versions of the activity in the relevant activity class and/or as a key to further data tables or grids providing descriptions appropriate for that class of product.

The operation of the system will now be explained. First, one or more generic processes on which a corresponding one or more specific procedures for the product are to be based are selected. This selection may be made by the user of the system or, alternatively, the system may include rules to control this selection automatically. One manner in which automatic selection can operate is as follows. The synthesiser initially selects potentially appropriate generic processes, from those stored in the database, based on the generic product description or descriptions with which the specific product is associated. Then, on the basis of the data defining the desired product standards and/or constraints, the product properties and the process capabilities, the synthesiser eliminates from the selected generic processes those which are incapable of generating a product meeting the constraints. The remaining selected generic processes can then be used to generate the specific procedure or alternative procedures satisfying the constraints set. If none of the generic processes are capable of satisfying the constraints, the rules may control the synthesiser to select those generic processes which come closest to meeting the constraints.

Having selected one or more generic processes, the synthesiser then combines it/them with other data associated with the activities of the process, data derived on the basis of the associated generic product description(s), and the specific product information to obtain a corresponding one or more specific procedures. If more than one procedure is generated, it may be possible to have the system choose the optimum, for example based on a prioritisation of the specific product standards/constraints; ie. if cost is more important, the least costly procedure may be selected as optimum. In addition, or alternatively to generating the specific procedure, there can be derived, based on the data relating to the specific product standards or constraints, the product properties and the process capabilities, a measure of the total effort required to complete the procedure. For example, this may be a measure of total man hours required.

Where a selected generic process includes an iterative set of activities, the determination of effort requires that the synthesiser derives a number of iterations around that group of activities, so that the total effort for the iterative process can be calculated. In some instances, the number of iterations will be fixed in the generic process, or alternatively set by the user. In other instances, however, the number of iterations will be dependent on the ability of a process to provide a product compliant with certain standards or constraints. Thus the iterative loops of the generic processes can have data items associated with them representing compliance criteria and/or exit criteria.

The compliance criteria relates to one or more of the product properties, the synthesiser operating a set of rules, using the specific values of these properties given as the specific product standards or constraints and the process capabilities associated with the iterative activities (represented as statistical functions, for example) to derive a number of iterations necessary to meet with the compliance criteria. The exit criteria specify maximum numbers of iterations which can be used on their own to specify fixed numbers of iterations, or in combination with compliance criteria in order to prevent the synthesiser from generating specific procedure descriptions with infinite loops. In the latter case, the number of iterations in the final specific procedure description is determined as either the number of iterations necessary to meet the compliance criteria or as the number of iterations specified as the exit criteria, whichever is the smaller.

To populate the generic information database, generic product classes and the various data (activities, process equations, capability data) which defines the generic processes, and which might be referred to as a whole as a "process ontology", is preferably derived from empirical data. For example, generic processes or processing elements may be derived from existing best practice procedures in the following manner. One or more best practice procedures are considered and potentially generic activities, sequences of activities or complete procedures are abstracted from them. These potential generic processes can then be evaluated, for example by determining whether they can be applied to other, possibly diverse procedures, to ascertain their suitability as generic processes.

To illustrate this, consider a best practice procedure for deriving inspection procedures for a manufacturing process for an electronic silicon diode. The process is based on a statistical process control technique (SPC), the Kalman filter constants being set up in accordance with existing knowledge (a "list"), and has two main phases. Firstly, the sensitivity of important product characteristics to process variables is studied. Secondly, the inspection procedures are defined. In the particular case given as an example two inspection procedures are employed. In the first a relatively small sample of the product are tested for full compliance with a product specification. In the second procedure all products are checked for compliance with a limited number of particular parameters shown in the first phase of the process to be most sensitive to changes in the process variables.

In more detail, the procedure can be expressed as follows:

In order to derive the inspection procedures for a manufacturing process for a silicon diode.

---

(1). Understand how the furnace temperature and diffusion
gas pressures affect the forward volts drop and reverse
temperature characteristics.
To do this, characterise the production process as follows:
(a) Send 20 sample diodes through the production
process. Vary the furnace temperature by ±20° in this batch and
observe the effect on the forward volts drop and reverse
temperature characteristics.
(b) Send a further 20 sample diodes through the
production process. Vary the diffusion gas pressures in this
batch and observe the effect on the forward volts drop and
reverse temperature characteristics.
Set up the Kalman filter constants in the SPC system
according to diode list.
(2). Define the inspection procedures as follows:
(a) To meet the target of customer 1 ppm reject rate,
fully measure 20 out of each batch of 1000 diodes.
The whole batch must be checked if any of the 20
diodes fail the sample test.
(b) Partially inspect the whole of the batch of
diodes.
In doing this, choose the parameters from the
production process characterisation work that were shown to be
most sensitive in defining the diode characteristics.

---

From this, the following generic process may be abstracted:

---

In order to derive the inspection procedures for a
manufacturing process for PRODUCT.
(1). Understand how the PROCESS PARAMETERS (1,2,...N)
affect PRODUCT CHARACTERISTICS.
To do this, characterise the production process as follows:
For each of a series of process parameters N, and batches
of x sample PRODUCTS through the production process.
n = N

```
-continued

Vary PROCESS PARAMETER n (by VALUE) in each batch and
Observe the effect on PRODUCT CHARACTERISTICS
n = 1
Set up the Kalman filter constants in the SPC system
according to PREDEFINED LIST.
(2). Define the inspection procedures as follows:
(a) To meet the target of customer FREQUENCY reject
rate, fully measure SAMPLE out of each batch of BATCH, PRODUCT.
The whole batch must be checked if any of the SAMPLE,
PRODUCT fail the sample test.
(b) Partially inspect all the PRODUCT.
In doing this, choose the parameters from the process
characterisation work that were shown to be most sensitive in
defining the PRODUCT characteristics.
```

This generic process can then be applied to different products, for example a turbine blade manufactured by the lost wax process as illustrated below:

```
In order to derive the inspection procedures for a
manufacturing process for a cooled turbine blade
(1). Understand how the wax temperature and rate of change
of mould temperature affects the aerofoil root and shroud
geometry.
To do this, characterise the production process as follows:
(a) Send 20 sample blades through the production process.
Vary the wax temperature by 20% in this batch and observe
the effect on the aerofoil and shroud geometry.
(b) Send a further 20 sample blades through the production
process. Vary the rate of change of mould temperature in this
batch and observe the effect on the aerofoil and shroud
geometry.
Set up the Kalman filter constants in the SPC system
according to blade list.
(2). Define the inspection procedures as follows:
(a) To meet the target of 1 ppm customer reject rate,
fully measure 4 out of each batch of 20 blades.
The whole batch must be checked if any of the 4 blades
fail the sample test.
(b) Partially inspect all the blades.
In doing this, choose the parameters from the process
characterisation work that were shown to be most sensitive in
defining the blade characteristics.
```

As will be appreciated, the generic form may equally be applied to other manufacturing processes.

The following specific examples further illustrate the operation of data processing systems according to embodiments of the present invention.

EXAMPLE 1

This example illustrates the operation of a data processing system to obtain a procedure for designing a blade for the turbine of an aero engine.

Figure 2:
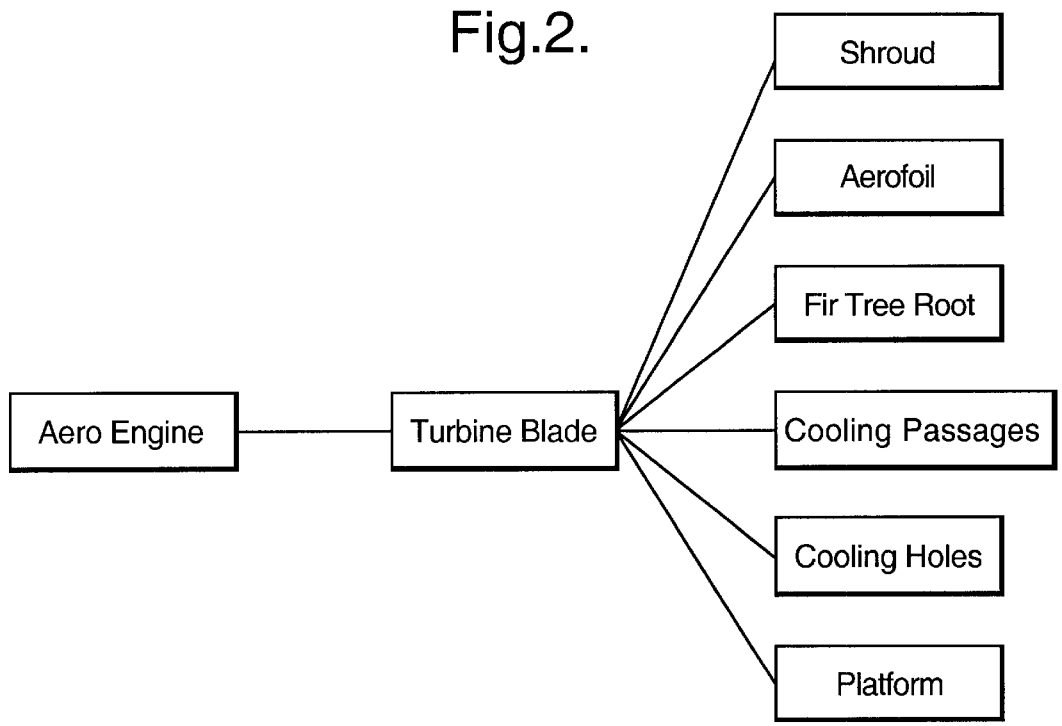
FIG. 2 is a simplified product breakdown tree for an aero engine.

The product breakdown tree of FIG. 2 forms part of the specific product information. The tree is far from complete and includes only those components relevant to the example described. Very few levels in the product breakdown above the blade are shown, but the overall product itself, the aero engine is identified. In practice, the product tree will typically include many further branches to provide a much more detailed breakdown of the product than is shown, in any one case the user selecting the specific branch(es) and/or component(s) for which a particular procedure is to be generated. Conveniently, such trees may be stored in the database of the system for subsequent re-use.

Figure 7:
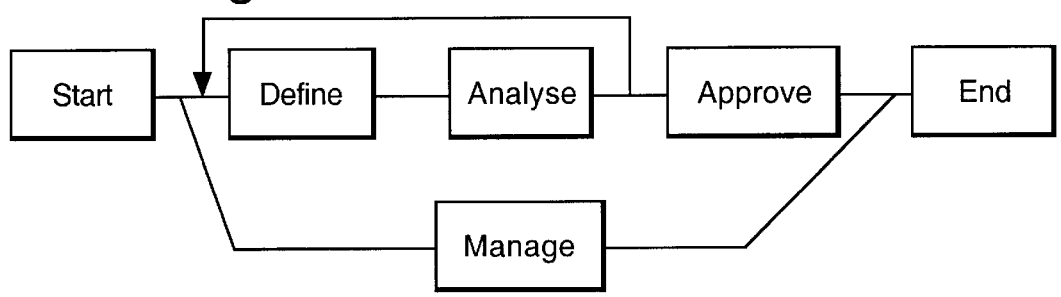
FIG. 7 illustrates a first generic process.
Figure 8:
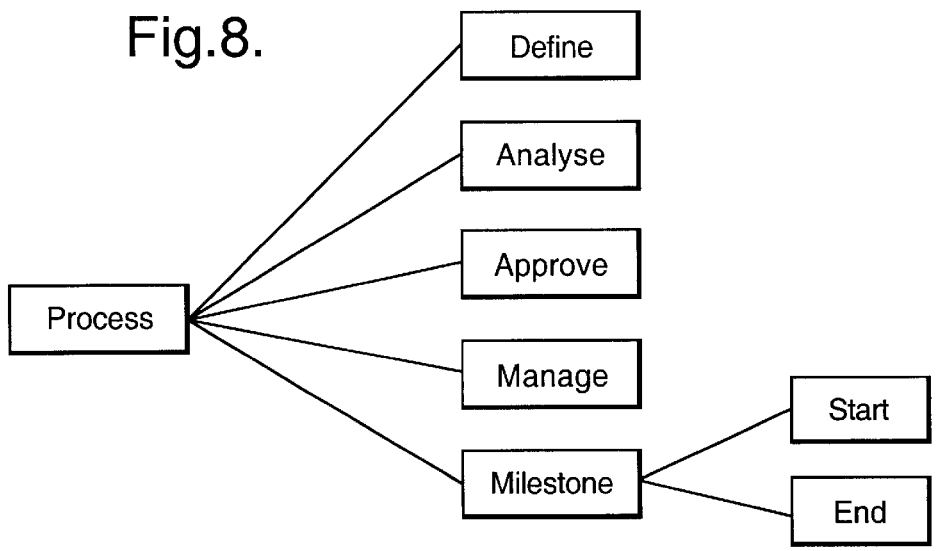
FIG. 8 is an extract from a second generic activity tree.

The generic process to be used in this example is seen in FIG. 7. The process includes a number of discrete activities ("START", "DEFINE", "MANAGE", etc) with a defined sequence, in this case including an iterative loop around the "DEFINE" and "ANALYSE" activities. The activities themselves are stored in the generic information database as a classified hierarchy, an extract of which is seen in FIG. 8. This can conveniently be considered as a library (library of activities available for use in the generic processes. For present purposes only those activities in the library actually used in the generic process of the present example are shown. In practice, there would be many more activities.

Each activity has data items associated with it from which can be derived a description of the activity and a processing capability for the activity appropriate to the particular product for which the procedure is to be obtained. The appropriate selection of these data items is made on the basis of a generic product description (or descriptions) to which the product is assigned. This particularising of the activities, and hence the generic process, is best illustrated by considering an instance of the method by which a specific procedure is generated from the generic process, concentrating on one of the activities in detail, for the purpose of this example the "ANALYSE" activity.

The user starts by identifying the overall product and the specific component for which a procedure is desired and if the generic process is not already associated with a particular class of procedure (design, manufacture, etc) this class is also selected. In this case the overall product (obtained from the root of the product tree) is an aero engine, the component is a turbine blade, and the class of procedure is mechanical design. Then using two look-up tables, brief extracts of which are shown in FIGS. 9 and 10 respectively, the system establishes that the overall product, an aero engine, is classified as a "gas turbine", and in a broader sense as a "mechanical rotating" product. On the basis of the classification as "gas turbine", reference is then made to a further look-up table (extract in FIG. 11) to establish that the relevant constraints for the product relate to "safety", "life", "cost", "weight" and "aerodynamic" properties. The specific description of each activity is derived using this information.

Specifically considering the "ANALYSE" activity. From two further look-up tables (extracts in FIGS. 12 and 13) it is established that a relevant analysis for assessing the life of a mechanical rotating product is "vibration", and that the form of activity description to use when considering a mechanical design is "Analyse <object> for vibration". The <object> field in this description is filled with the name of the particular component under consideration, in this case the "blade", to complete the activity description.

In the same way, using the same or similar look-up tables, particularised descriptions are derived for all of the other activities in the generic process to arrive at the specific procedure illustrated in FIG. 14. Here, the analysis relevant to only one of the constraints, vibration analysis to assess life, has been considered, but it will be appreciated that the procedure can be expanded to include further analysis relevant to other constraints.

Typically, a prediction of the duration of the generated procedure will also be wanted. To do this, it is necessary to predict the duration of each activity, and also the number of iterations required around the define and analyse loop. To provide this prediction the synthesiser refers to a further set of look-up tables for each activity from which its processing capabilities in relation to the specific product and the particular class of procedure under consideration can be derived. Relevant extracts of these tables for the "ANALYSE" activity are shown in FIGS. 15 to 17.

To ascertain the class of severity of constraints for the specific product the user is prompted for relevant required performance standards or constraints, for example in the case of a gas turbine these might be compressor efficiency (HPC) or maximum gas temperature at inlet to the turbine (TGT). Alternatively, these standards or constraints may be provided as pre-defined attributes of the product tree, ie. data associated with particular components of the tree. Let us assume in the present case that, since the procedure is for a turbine blade, an important performance standard is a TGT of 1725° C. From this, the synthesiser establishes from the table seen in part in FIG. 15 that within Company A, for the specific product, the class of difficulty is medium.

Using this result, it can be predicted from the process capability data in the table of FIG. 16 that the mean number of iterations to meet the required standard is 2, with a standard deviation of 1. If desired, the system can then determine a specific value in any particular case based on this statistical data. Alternatively or additionally, the statistical data itself may be given in the results.

To predict the duration of the "ANALYSE" activity, which for analysis of vibration in a mechanical design procedure is assumed to be a finite element (FE) analysis activity, the user is prompted to enter the FE capability of their organisation. This may be determined for example by the version of FE software they are using and the speed of the system it is running on. Alternatively, the FE capability may already be part of the information stored in the generic process database. Using the FE capability and the product complexity, which may be entered by the user or may be a pre-existing attribute of the product tree. For example, if the complexity is taken to be medium, a duration for the activity of 1 day is obtained from the table of FIG. 17.

The duration of the other activities in the procedure can be established in a similar manner on the basis of the product complexity and/or other properties of the product if appropriate.

Figure 18:
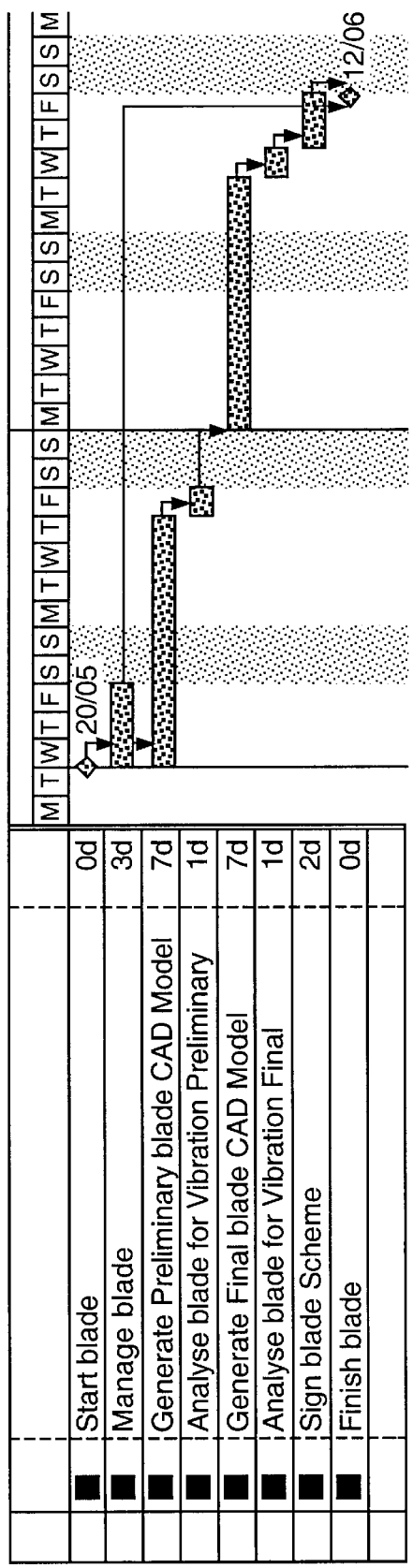
FIG. 18 is an example output from the data processing system for the first specific procedure.

The generated procedure is stored in a format which is reusable by one or more other applications, in this case Microsoft Project, so that the procedure can be displayed and/or simulated. FIG. 18 shows one exemplary display, here as a task list. The two iterations around the define and analyse loop have been given the labels "preliminary" and "final" respectively. These labels can be defined in the generic process equation. Advantageously, the generated procedure may include enough detail to be useful, for example, in subsequent implementation of the process, eg. as an input to a CAD/CAM system.

It is also possible, as a result of the detailed descriptions generated, to automatically create references or even electronic links to further related information, for example information such as component or product specifications held on a company's intranet. For instance selected parts of the activity and product descriptions can be combined to provide an input to a search engine to identify the related information.

As will be appreciated, the generic activities and processes described above can be used, in combination with further look-up tables, as the basis for many other specific procedures, by substituting alternative product breakdowns which may well relate to an entirely different class of product (eg. an electronic component).

A further advantage of the system is that it is very easily adapted for use in different organisations or departments within one organisation where for example, processing capabilities and the descriptions used for particular activities may differ. In the example described above, for instance, the descriptions of activities can be adapted by modifying one or two look-up tables, (eg. those of FIGS. 12 and 13) without the need for drastic re-design of the whole system. This approach may even be used to adapt the system to provide activity descriptions in languages other than English for example. It is also possible to provide a single system which is applicable to more than one organisation or department by providing alternatives within one look-up table, seen for example in FIG. 15, where data is presented for two different companies. All the user is required to do when operating the system is to indicate which company the procedure is to be generated for.

Thus, by structuring the data in this manner, with generic data at a top level and data at lower levels of gradually increasing specificity, an extremely flexible system can be provided to assist in the development of procedures for industry which, while potentially allowing radical departures from existing procedures, provide detailed descriptions of their procedures which can be easily reused.

Furthermore, having this route established for design of a turbine blade, it is available for analogous products—varied only by the design constraints (eg. ventilating fan or windmill).

EXAMPLE 2

This example illustrates the applicability of the data processing system to a manufacturing procedure, specifically a procedure for manufacturing a turbine blade. The same general steps are taken to synthesise the activity descriptions and durations as explained above in relation to the first example, so these will not be repeated here. Instead, the following discussion concentrates on additional features of the system seen in this example.

Figure 20:
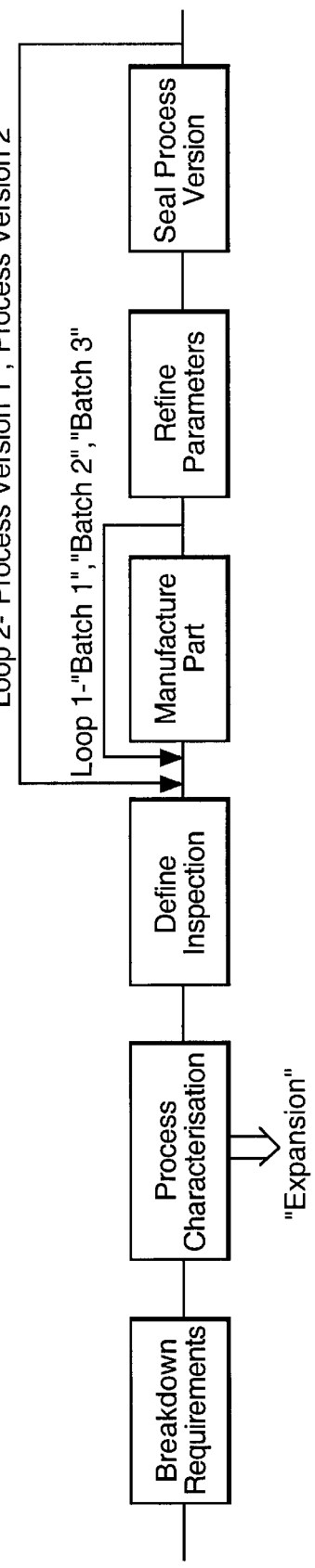
FIG. 20 illustrates a second generic process.
Figure 19:
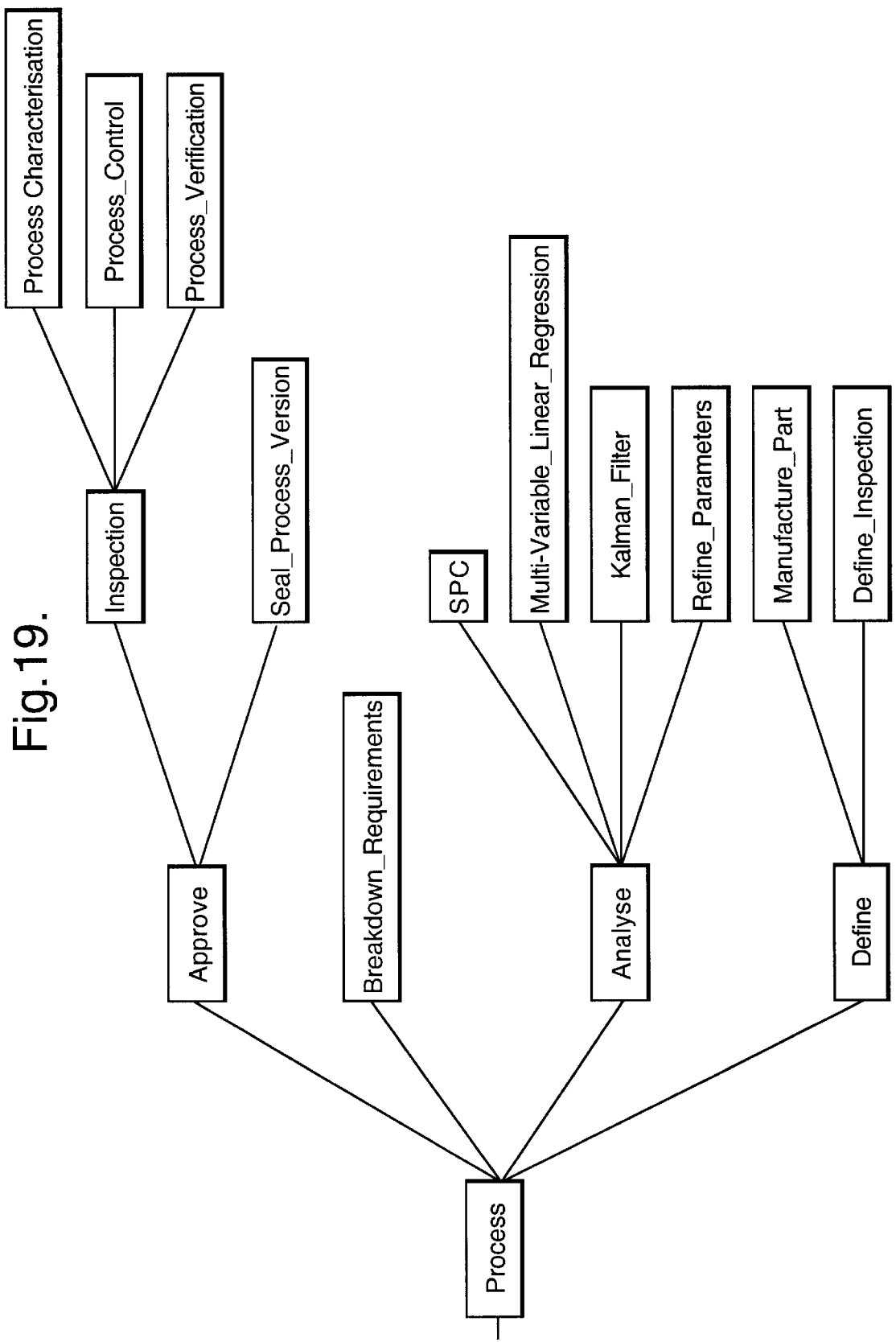
FIG. 19 is another extract from the second generic activity tree.

The same product tree may be used for this example as was used above (FIG. 2). The activities comprised in the generic process for this example also come from the same hierarchy (library) as before, but from a lower level (FIG. 19 therefore shows a larger extract from the activity hierarchy). The generic process itself is thus less widely applicable, and is in fact limited to the manufacturing environment, being particularly suited to products characterised by a number of variables which may be refined during operation of the manufacturing procedure. The generic process is defined by a process equation which identifies particular activities from the activity hierarchy and defines their sequence, and is illustrated in FIG. 20.

Figure 21:
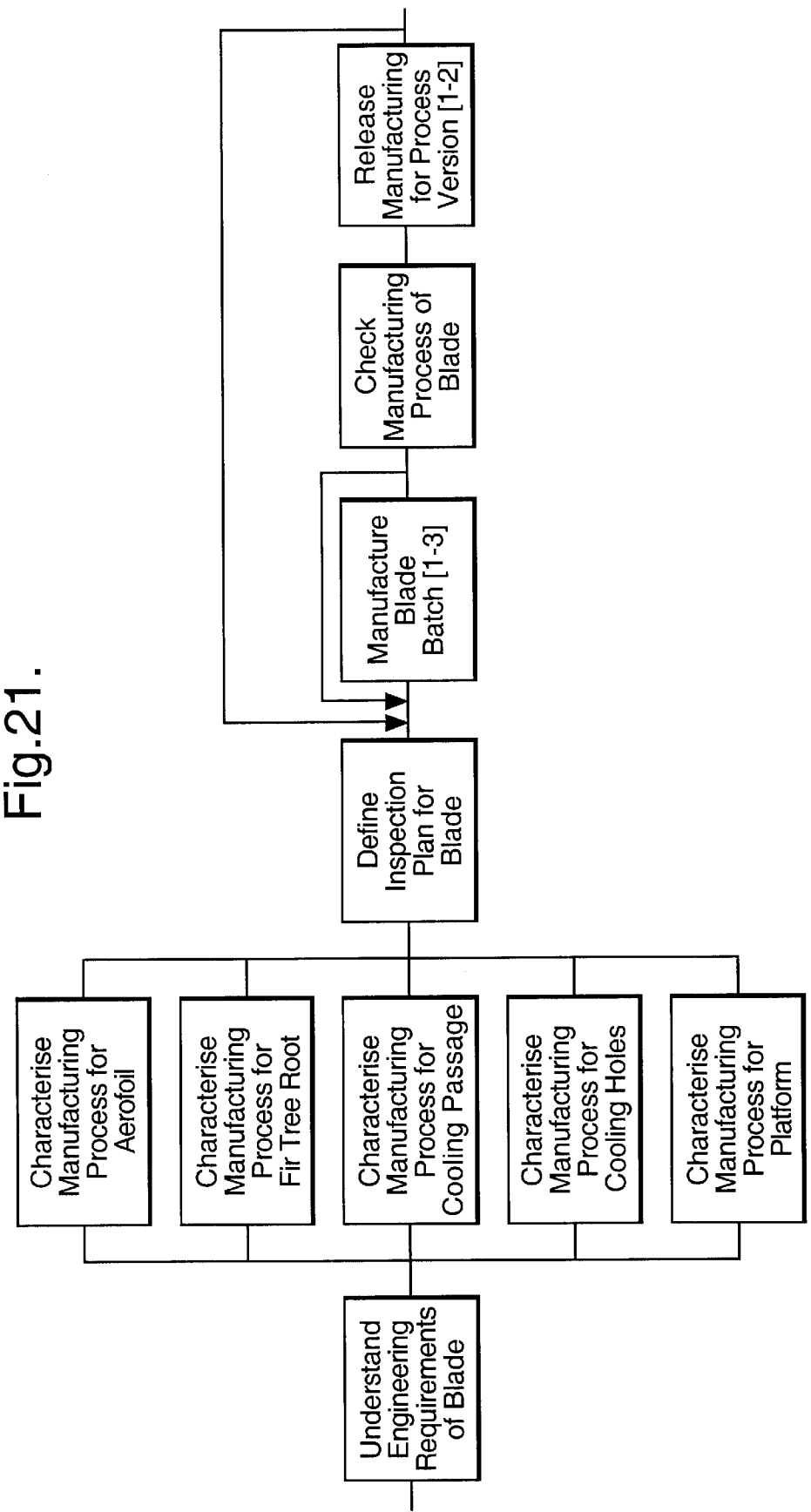
FIG. 21 illustrates a second specific procedure derived from the second generic process.

The specific procedure generated from the generic procedure and the specific product information, particularised activity descriptions having been derived in a similar manner to the first example, is illustrated in FIG. 21. In the first example, the overall procedure and each of the activities of the procedure are applied to a single component of the product, the turbine blade. In the second example, whilst the overall procedure is wanted for manufacture of the turbine blade, account is taken of the various sub-components of the blade, seen at the lowest level in the product breakdown of FIG. 2. In this case, only one activity is applied to the sub-components, the "PROCESS-CHARACTERISATION" activity. To enable this, the activity is identified in the process equation as an "expansion" activity; that is an activity that is applied to sub-components one level down in the product breakdown from the component for which the procedure is being developed.

Where sub-components are being considered in this manner, it may be desirable to indicate which activities are to be applied to which sub-components on a one-to-one basis, rather than simply specifying that an activity applies to all sub-components. One way of achieving this functionality is to incorporate it into the system a matrix as illustrated in FIG. 22, the applicability of an activity to a particular sub-component being indicated at their intersection in the matrix, eg. by user input. Alternatively, the system may be set-up to make this selection/deselection of activities automatically, for example based on one or more attributes of the product under consideration.

It may also be the case that an activity should be applied at one or more other levels of the product breakdown, eg. to sub-components of the sub-components (not shown in the figures), or indeed at all levels in the product breakdown including those levels above the component for which the procedure is being developed (referred to as "recursion"). This may also be indicated in the process equation and/or using an activity/product breakdown matrix.

As with the first example, the activities have processing capability data associated with them from which the duration of each activity, and hence the duration of the complete procedure can be obtained. In contrast to the first example, however, the number of iterations around each iterative group of activities (loop 1, loop 2) is not dependent on the product constraints. Rather, the number of iterations is pre-set, (whether fixed in the generic procedure or set by the user) for loop 1 to give the desired number of batches of components, and for loop 2 to give a desired number of process revisions. As with the first example, the process equation defines appropriate labels for each iteration, here "Batch 1", "Batch 2", etc. for loop 1, and "Process Version 1", "Process Version 2", etc for loop 2.

EXAMPLE 3

Figure 23:
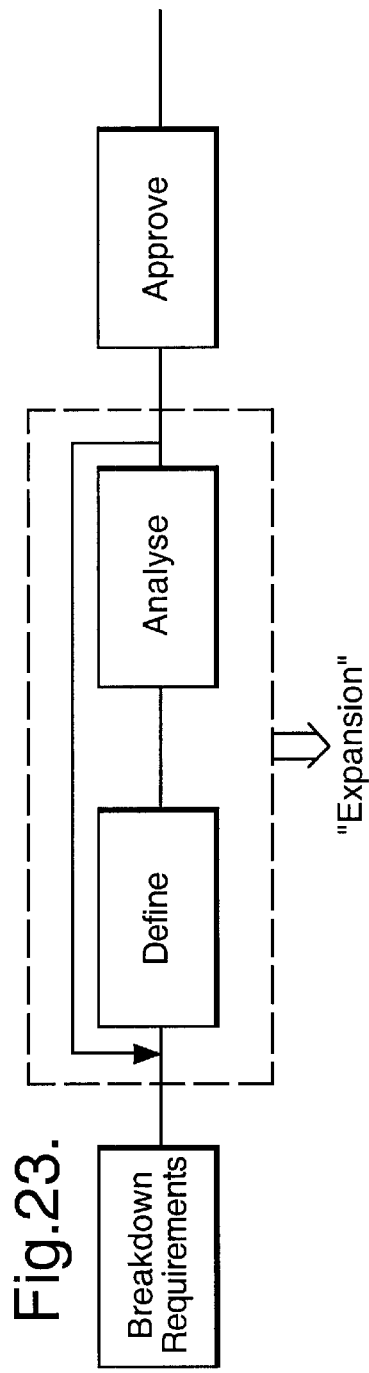
FIG. 23 illustrates a third generic process
Figure 25:
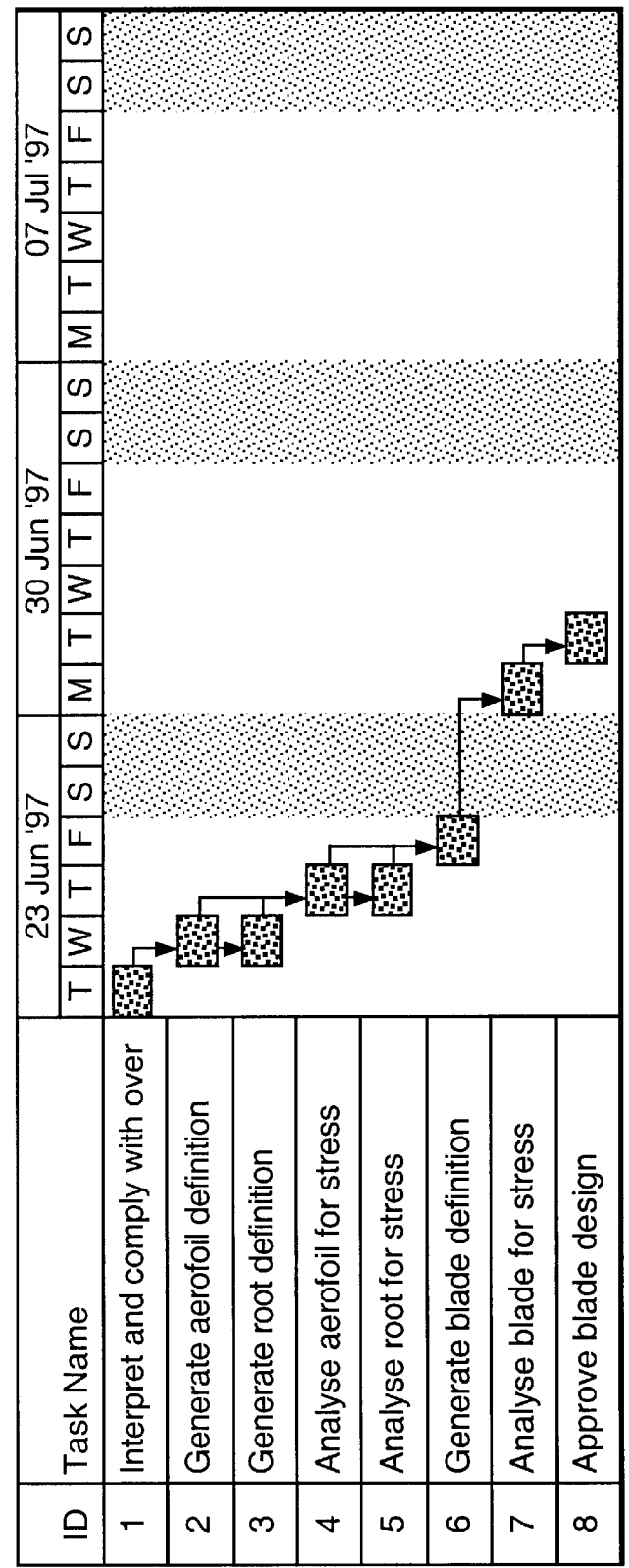
FIG. 25 is an example output from the data processing system for the third specific process.
Figure 24:
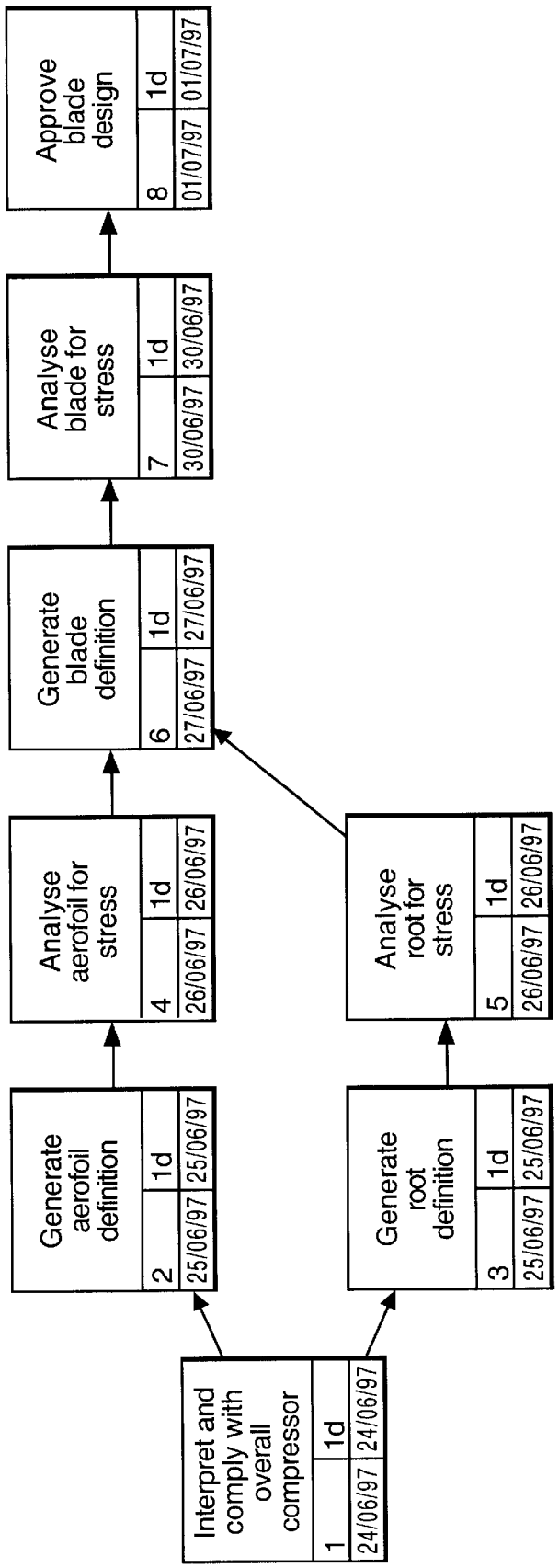
FIG. 24 illustrates a third specific procedure derived from the third generic process.

This example, the generic process for which is illustrated in FIG. 23, is similar to the first example. The descriptions of the activities differ slightly, but the major difference is that the process equation specifies that the define and analyse activities are to be applied to sub-components of the object, in addition to the object itself. The resulting specific procedure is shown in FIG. 24. The duration and the necessary number of iterations are determined as described above in relation to the first example. FIG. 25 shows the specific procedure in the form of a task list, only one iteration of each "analyse" activity being shown.

EXAMPLE 4

Advantageously, the system can be used to generate complete procedure descriptions even where there is still uncertainty in one or more of the product parameters, as may be the case in the early stages of a design procedure for example. As the parameters are fixed, the system can be used to generate more accurate plans.

Taking the example of a multi-stage compressor for an aero engine, at some stage the system will be used to generate a complete procedure description, eg. for manufacture of the product, treating the compressor as a single component, the duration of activities making up the procedure being derived on the basis of an assigned complexity of the compressor as a whole. In addition, a component breakdown of the compressor may be modelled probabalistically within the system. For example one or more relationships may be defined, eg. in a look-up table, relating product performance parameters to a probabalistic value for one or more parameters of the product. An example is given in FIG. 26, showing a relationship between compressor pressure ratio and the likely number of compressor stages required for three different compressor stage configurations.

Using this table and/or others like it, for any particular case a value of the or each uncertain parameter can be derived and used as part of the specific product information used to generate the procedure. Once the actual value of the parameter is known, the value derived from the probabalistic data can be substituted and the system re-run to generate a procedure based on the actual value.

EXAMPLE 5

The data processing system can be widely applicable to many different technical fields for the development and/or optimisation of industrial procedures. By way of example only, one potential field of practical application is that of procedures for bringing a new product such as an aero engine to the market.

Figure 27:
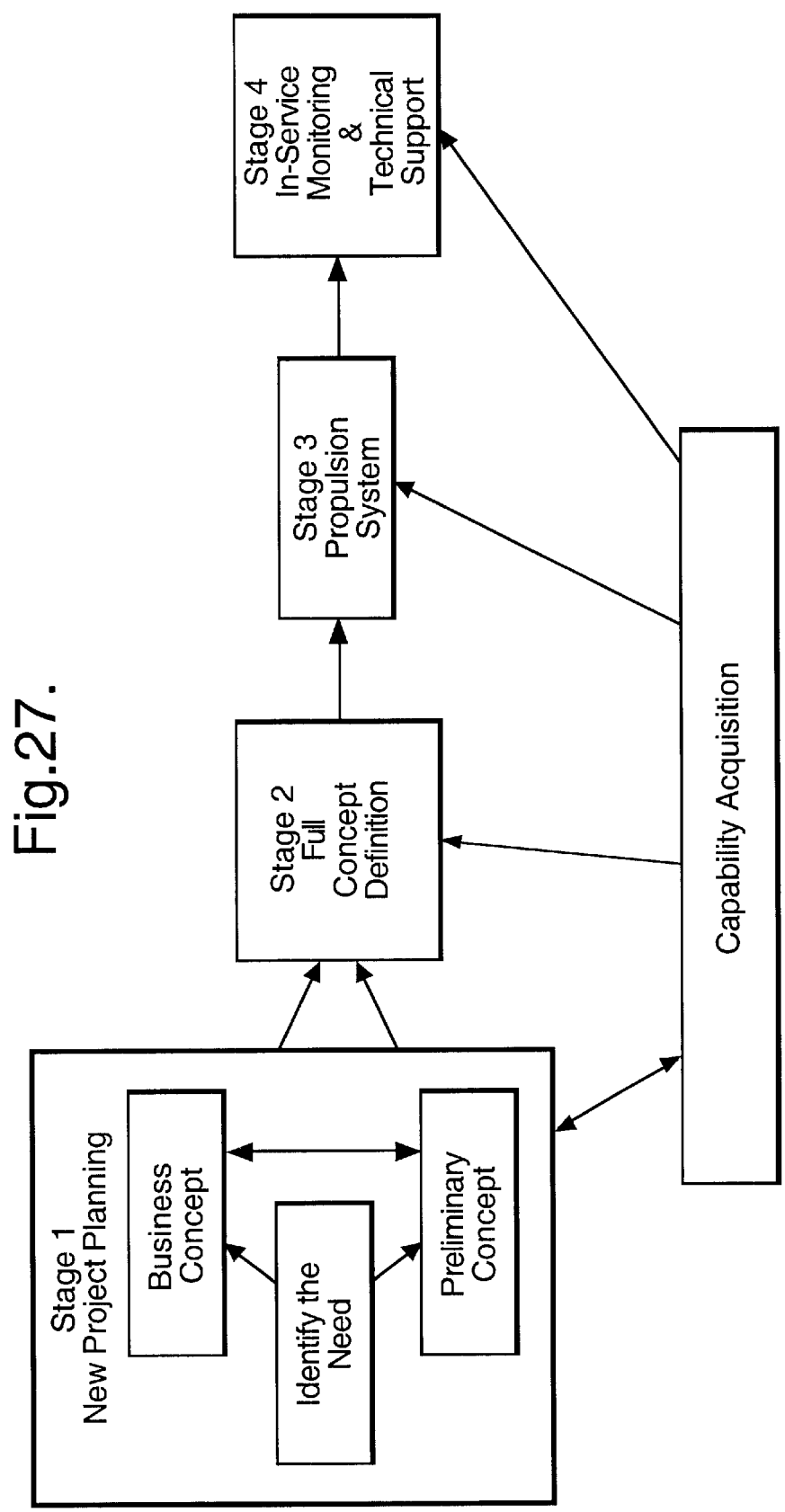
FIG. 27 illustrates a procedure for bringing an aero engine to the market.

Referring to FIG. 27, conventional procedures may be used in the preliminary design phase in order to develop a full concept definition for the product (aero engine), giving information about the major sub-assemblies or modules of the aero engine. This information can be used as the specific product information input to the data processing system of the present invention. The system can then be used to generate one or more possible procedures for taking the aero engine from the preliminary design phase through to release to the market.

With a complex product such as an aero engine it may be convenient to divide the overall procedure into phases, in which case the synthesiser may be used to develop procedures for one or more particular phases. Alternatively, it may be desired to generate the overall procedure at the outset. In either case, as the overall procedure progresses through various development stages and further information about the product is elicited, this can be input to the system to develop more detailed procedure plans for the later stages of the overall procedure.

We claim:

1. A method of optimizing an industrial procedure for a product, using a database comprising:
   (a) generic product descriptions of product physical and/or functional elements and associated properties,
   (b) generic descriptions of processing elements and capabilities in relation to the procedure,
      and a series of rules relating to (a) and (b); specific product information being provided in terms of said generic product descriptions, including product constraints in terms of said associated properties,
      and the rules being operated to derive for the specific product information, from the a data of (a) and (b)
         (i) a selection of valid combinations of (a) and (b) as industrial activities, and
         (ii) an arrangement of the activities of (i) in order.

2. A method according to claim 1, wherein said rules are operated to obtain additionally:
   (iii) a derivation from (a) and (b) of a measure of effort to perform each activity, and
   (iv) integration of the results of (iii) for individual activities to derive a measure of the total effort required.

3. A method according to claim 1, wherein operation of said rules derives a prediction of an ability of the procedure to meet the product constraints set.

4. A method according to claim 1, wherein the database includes generic descriptions of processing elements for a plurality of different classes of activity.

5. A method according to claim 4, wherein the or each said class includes a number of different descriptions of processing elements at differing levels of abstraction.

6. A method according to claim 1, wherein rules used to derive the arrangement of the industrial activities are expressed as one or more process.

7. A method according to claim 1, wherein a sequence of activities making up the procedure includes an iterative group of activities and the operation of the rules gives a statistical prediction of an iterative effort required to arrive at a product which best fits the constraints set.

8. A data processing method for obtaining a procedure for generating a product, the method using a computer based data processing system comprising:

digital processing means, and digital storage means, the digital storage means having a database stored therein comprising:
  (a) data defining generic product descriptions in terms of physical and/or functional elements and associated properties,
  (b) data defining a plurality of generic process descriptions in terms of process activities, activity sequence, and associated process capabilities, at least one of said generic process descriptions including an iterative set of process activities, and
  (c) data defining rules relating to (a) and (b),
  the method comprising:
    providing the system specific product information for the product, including information associating the product with one or more of the generic product descriptions and information defining constraints for the product in terms of said properties of the associated generic product descriptions,
    operating the digital processing means in accordance with the rules to derive for the specific product information, from the data of (a) and (b), a valid combination of a specific product information and a generic process description as the procedure for generating the product.

9. A method according to claim 8, wherein said valid combination is based on a generic process description including a description of said at least one iterative set of activities, and the operation of the digital processing means also derives, on a basis of the product constraints and the process capabilities for the activities of said iterative set, a prediction of the number of iterations required, or a prediction of an outcome for a given number of iterations.

10. A method according to claim 9, wherein the data defining the process capabilities takes a form of look-up tables and/or statistical functions, defining relationships between product properties and a predicted number of iterations.

11. A data processing method for obtaining a procedure for generating a product, the method using a computer based data processing system comprising:

digital processing means, and digital storage means, the digital storage means having a database stored therein comprising:
  (a) data defining generic product descriptions in terms of physical and/or functional elements and associated properties,
  (b) data defining a plurality of generic process descriptions in terms of process activities, activity sequence, and associated process capabilities, and
  (c) data defining rules relating to (a) and (b), the method comprising:
    (1) providing the system with specific product information for the product, including information associating the product with one or more of the generic product descriptions and information defining constraints for the product in terms of a generic product properties, a data to be processed further including information defining ranges of probability of one or more parameters of said product, and
    (2) operating the digital processing means in accordance with the rules to select a specific value for the or each said defined product parameter range and to derive for the specific product information, on a basis of said selected parameter(s), from the data of (a) and (b), a valid combination of the specific product information and a generic process description as the procedure for generating the product.

12. A method according to claim 11, wherein the processing means carries out the above operation (2) a plurality of times, each time selecting a value of the or each said product parameter, to develop a plurality of alternative possible procedures.

13. A method according to claim 12, wherein the rules control the processing means to carry out the plurality of operations in a manner of a 'Monte Carlo' simulation, to derive a most likely best case and worst case procedures in relation to the product constraints.

14. A computer based data processing system for use in providing a procedure for generating a product, the system comprising:
  (1) a storage unit having stored therein data defining:
    (a) one or more generic product descriptions of product physical and for functional elements and associated properties;
    (b) generic descriptions of processing elements and capabilities in relation to the procedure; and
    (c) a series of rules relating to (a) and (b) (2) a digital processing unit comprising a first processing means for operating the stored rules to derive for specific product information given in terms of said generic product description, from the stored data:
      (i) a selection of valid combinations of (a) and (b) as industrial activities, and
      (ii) an arrangement of the activities of (i) in order; and
    a second processing means to store said derived selection and arrangement in the storage unit as an output file.

* * * * *